E. E. JOHNSON.
GEARING FOR DEEP WELL PUMPS.
APPLICATION FILED JUNE 13, 1919. RENEWED NOV. 4, 1921.
1,438,494.
Patented Dec. 12, 1922.
Fig. 1
Fig. 2
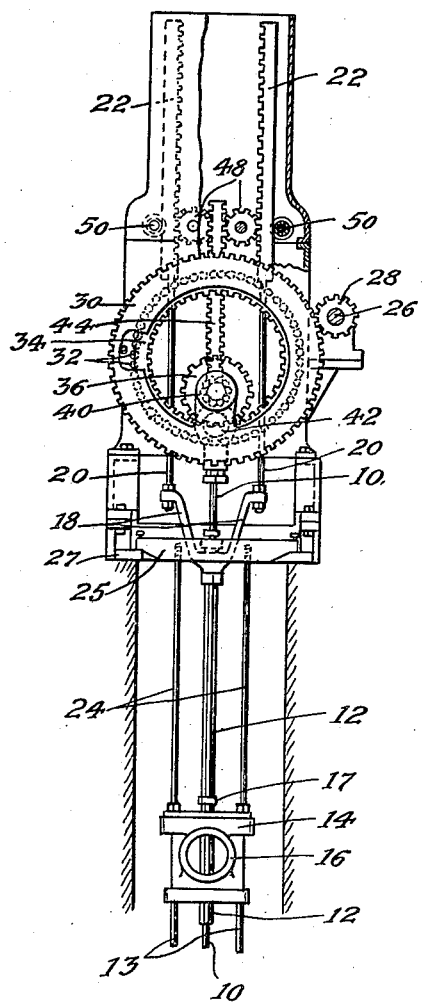
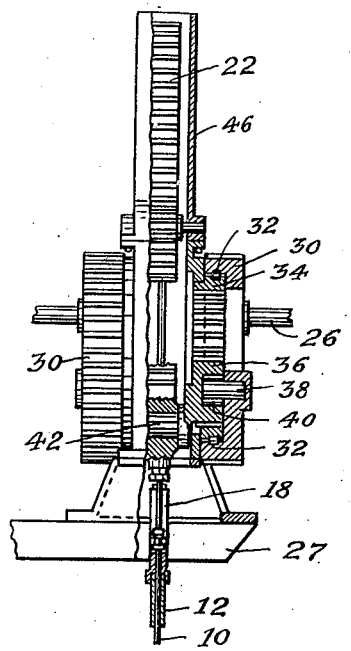
Inventor:
Edward E. Johnson
By Whiteley and Ruckman
his Attorneys.

Patented Dec. 12, 1922.

1,438,494

UNITED STATES PATENT OFFICE.

EDWARD E. JOHNSON, OF ST. PAUL, MINNESOTA.

GEARING FOR DEEP-WELL PUMPS.

Application filed June 13, 1919, Serial No. 303,904. Renewed November 4, 1921. Serial No. 512,939.

*To all whom it may concern:*

Be it known that I, EDWARD E. JOHNSON, a citizen of the United States, residing at St. Paul, in the county of Ramsey and State of Minnesota, have invented certain new and useful Improvements in Gearings for Deep-Well Pumps, of which the following is a specification.

My invention relates to gearing for deep well pumps. An object is to provide a pump head for pumps of this character in which the operating mechanism is of a compact nature and is brought close to the foundation upon which the pump head is supported so that a particularly rigid and solid construction is provided, and racking and straining thereby reduced to a minimum. The subject matter disclosed in the present application is of the same general nature as that disclosed in my copending applications Serial Numbers 303,902 and 303,903, both filed June 13, 1919.

The full objects and advantages of my invention will appear in connection with the detailed description thereof and the novel features embodied in my inventive idea will be particularly pointed out in the claims.

Referring to the accompanying drawings which illustrate the application of my invention in one form,—

Fig. 1 is a view in vertical sectional elevation. Fig. 2 is a part sectional and part elevational view at right angles to the position shown in Fig. 1.

Referring to the drawings, 10 designates a solid reciprocating rod, to the lower end of which the lower pump plunger is secured as usual. A hollow reciprocating rod 12 surrounds and is adapted to slide relatively to the solid rod 10, and the upper pump plunger is secured to the lower end of the hollow rod in the customary manner. The upper end of the pump tubing is secured to a hollow supporting member 14 provided with an opening 16 for the discharge pipe. The pump rods pass through a gland 17 secured in the top of the member 14 and the upper end of the hollow rod 12 is secured to a cross head member having two arms 18 to which are secured rods 20 having racks 22 attached to the upper ends thereof. The member 14 is suspended upon rods 24, the upper ends of which are attached to a spider 25 which is supported by the channel bars 27 upon which the pump head is mounted. The pump head is provided with bearings for a transverse driving shaft 26 to which are secured two pinions 28 which mesh with the external gears 30 rotatably mounted upon a circular series of roller bearings 32 which are located between an inner offset wall of the gears 30 and an outer wall of the internal ring gears 34 which are rigidly secured to the gear casing. Spur gears 36 mesh with the internal gears 34, the diameter of these spur gears being one-half the diameter of the internal gears. The spur gears 36 are rotatably mounted on the studs 38 attached to the gears 30, a circular series of roller bearings 40 being interposed between the studs and the internal wall of the spur gears 36. The two spur gears 36 are connected by a crank-pin 42 which is positioned so that the center thereof extends between the pitch lines of the gears 36. In operation the rotation of the gears 30 carries the gears 36 in an annular path thereby rolling them around within the internal gears 34. Since the latter have a diameter twice that of the gears 36 the crank pin 42 moves in a straight line up and down, this line extending diametrally of the annular path. Journaled upon the crank pin is a bearing member to which the upper end of the solid pump rod 10 and the lower end of a double rack 44 are secured so as to be in vertical alinement with each other. The rod 10 and the rack 44 are therefore reciprocated in a straight line with no lateral movement. Journaled at the upper end of the gear casing are pinions 48 which mesh with the double rack 44 and also with the racks 22 on their inner edges. Rollers 50 are also journaled in the casing and these rollers engage and support the outer edges of the racks 22 for a reciprocating movement. On account of this arrangement the rack 44 and the racks 22 will be reciprocated in reverse directions and thereby reciprocate the pump rods 10 and 12 oppositely from each other.

I claim:

1. In pumping mechanism, a pair of pump rods and mechanism for operating the same, comprising a fixed internal gear, a member supported for rotation upon the outer wall of said internal gear, a spur gear rotatably mounted on said rotatable member and meshing with said internal gear and having a diameter half that of said internal gear, a crank pin secured to said spur gear and moved thereby along a diameter of said internal gear, one of said pump rods having its upper end journaled on said crank pin, a double rack secured to said last-named pump rod at its upper end, two racks connected to the upper end of the other pump rod, and pinions interposed in meshing engagement between said racks and the opposite toothed faces of the double rack.

2. In pumping mechanism, a pair of pump rods and means for operating the same comprising a support, an internal gear fixedly mounted thereon, a ring gear mounted for rotation around said fixed gear, a spur gear carried by the ring gear and meshing with the internal gear, means connecting one of said pump rods with the spur gear for reciprocating the pump rod, a double rack extending away from the end of said last-named pump rod and reciprocating therewith, a pair of racks connected with the second pump rod, and pinions operative between the sides of the double rack and the respective single racks for actuating the second pump rod in reverse direction to the movement of the first mentioned pump rod.

In testimony whereof I hereunto affix my signature.

EDWARD E. JOHNSON.